Patented June 26, 1934

UNITED STATES PATENT OFFICE 1,963,973

PROCESS OF PREPARING RAPIDLY DRYING COATINGS

Ernst Elbel and Fritz Seiter, Erkner, near Berlin, Germany, assignors to Bakelite Gesellschaft mit beschränkter Haftung, Berlin, Germany No Drawing. Application May 29, 1931, Serial No. 541,110. In Germany June 3, 1930

7 Claims. (Cl. 91—68)

This invention relates to the preparation of rapidly drying coatings from varnish compositions obtained by dissolving the products which are obtained from the compounds of fatty oils and resoles by reacting same with organic acid anhydrides or acid chlorides.

The production of compounds from fatty oils and phenol-aldehyde resins is the object of the pending applications Serial Number 427,993 of Fritz Seebach, filed February 12th, 1930 and 446,794 of Fritz Seebach, filed April 23rd, 1930. The transformation of the compounds obtained from phenol-aldehyde resins and air-drying fatty oils with organic acid anhydride or acid chlorides forms the object of the pending application Serial Number 521,509 of Fritz Seebach, filed March 10th, 1931.

According to application 427,993 synthetic resinous products of a hardenable nature from phenols and aldehydes in their fusible and soluble initial condition are combined, preferably in the presence of solvents, with air drying fatty oils that have been oxidized or partially oxidized. The later application 446,794 describes the preparation of products from a hardenable phenol-aldehyde resin (or its equivalent) and tung oil by heating them together in the presence of a suitable solvent.

The conversion of the compounds, formed according to the aforesaid patent applications, is attained with astonishing ease and a reaction obviously takes place between the hydroxyl groups of the phenol-aldehyde resins and the acid anhydrides or acid chlorides. The resins obtained by the transformation are very readily soluble in the usual solvents of the varnish art, for example, oil of turpentine. They dry very rapidly in air and exhibit greater hardness than copal or amber lacquers. In their air-dried state they are sufficiently resistant to organic solvents and completely resistant to soda-lye. The resistance to lye (and by the term lye are meant the solutions of the free caustic alkalies such as NaOH or KOH) is so marked that the lyes do not even affect the freshly-applied coating.

For example 100 parts resole are reacted by heating, according to the process of the patent application 446,794, with 100 parts of tung oil and 200 parts of a solvent such as cyclohexanol. The solvent is distilled off in vacuum except for a few percent which may remain in the mixture. Then 100 parts of acetic anhydride are added and the solution is boiled for about 2 hours. The acetic acid formed and the unconverted acetic anhydride are then removed as completely as possible by distillation in vacuo. The residue may be again dissolved in the cyclohexanol which was distilled over in the first operation. Only a small fraction of the cyclohexanol need be added and again distilled off, so that the last traces of acetic anhydride disappear. The resin is soluble in an alcohol-benzol mixture, in benzol or in turpentine.

It is also possible to dissolve or suspend the compound of the resole and an air-drying oil such as tung oil in alkali, and then to transform the compound with an acid chloride such as benzoyl chloride. The resinous conversion product is separated off, washed and dissolved in a solvent.

The conversion with acid chlorides or acid anhydrides may be accelerated by using catalysts. It is well known that acids, such as sulfuric acid or sulfo-acetic acid, act as accelerators in the process of acetylating. The acids to be used as catalysts must, as a rule, be removed from the conversion product, and consequently those acids are used as accelerators which may be removed readily. For example, the reaction between acetic anhydride and the hydroxyl groups of resin-oil compounds may be accelerated by passing a small quantity of sulfurous acid through the solution of the resin-oil compounds in a solvent for a short time at normal or elevated temperature. The resin-oil compounds thus treated are converted so vigorously by acetic anhydride that it is necessary to add the acetic anhydride during the reaction in a thin stream at most. In place of sulfurous acid, gaseous hydrochloric acid may be used as the accelerator. This sulphurous or hydrochloric acid may again be driven off by a current of $CO_2$. Several catalysts mixed together, or several catalysts used one after the other, may also be employed. In addition to the acids, anhydrous sodium acetate can also be used as an accelerator.

For the production of the conversion products with organic acid chlorides or acid anhydrides all the compounds of phenol-aldehyde condensation products and air-drying oils may be used which can be obtained according to the pending patent applications 427,993 and 446,794. As acid anhydrides or chlorides, the anhydrides or chlorides of aliphatic or aromatic acids may be used, for example, acetic anhydride, the mixed anhydride of formic and acetic acids, benzoyl chloride, fatty acid chlorides, such as the chlorides of palmitic, stearic or adipic acids, etc. It is also possible to use a mixture of several acid anhydrides or acid chlorides. These compounds are used in such amount that the reaction with the hydroxyl groups of the phenol-aldehyde condensation products is as complete as possible. The materials remaining unchanged in the reaction and any by-products formed, are removed from the conversion product, as for example by distillation.

The final product may be used for instance as varnish either with or without the addition of driers. With the aid of these varnish compositions air-drying paints are obtained which have extremely good properties as regards hardness, elasticity and resistance to chemical influence, to mechanical wear and to exposure to light. The varnishes are made by dissolving the transformation products in the usual varnish solvents, such as oil of turpentine, acetone, benzol alcohol, amyl esters etc.

It has been found that the properties of the coatings manufactured from varnish compositions, which have been obtained from the transformation products described, can be substantially improved if first of all a layer of cellulose derivatives, such as for example, nitrocellulose, caoutchouc or similar natural or artificial plastic substances are applied to the base to be coated, applying to said layer after drying a further layer of a solution of the transformation products. According to this process, coatings of increased elasticity are obtained, the surface of which is of the same hardness as the varnish coatings made with the solutions of the transformation products alone. It is also possible to proceed in such a way that first a layer from the solution of the transformation product is applied and thereafter a layer of the cellulose derivatives such as for example nitrocellulose.

Each varnish layer must be air-dried before applying the next layer. It takes about 4 hours to dry cellulose varnishes and about 15 hours to dry oil-varnishes.

*Example 1*

50 parts by weight of a transformation product, obtained in the manner described above, from 100 parts of resole, 100 parts of tung oil and 100 parts of acetic anhydride, are dissolved in 50 parts by weight of oil of turpentine. 1 part by weight of a 50% solution of manganese resinate in oil of turpentine is added to the before mentioned solution. At the same time a solution is prepared by dissolving 10 parts by weight of collodion cotton in a mixture of 12.8 parts by weight of alcohol and 77.2 parts by weight of butyl acetate. With the said two solutions alternate coatings are made in the manner described, drying each layer in the air before applying the next layer.

*Example 2*

50 parts by weight of one of the transformation products mentioned in Example 1, consisting of resole, tung oil and acetic anhydride, are dissolved in a mixture of 16.7 parts by weight of toluol and 33.3 parts by weight of varnish benzine, if necessary adding thereto drying substances. For the purpose of producing coatings, besides this varnish, a solution is used which is obtained by dissolving 10 parts by weight of collodion cotton in a mixture of 37.5 parts by weight of toluene, 37.5 parts by weight of butyl-acetate and 15 parts by weight of acetic ether.

We claim:

1. Process of making rapidly drying coatings which comprises applying to a base a layer of a plastic substance in alternation with a layer of a transformation product obtained by reacting a phenol-aldehyde resin with an air-drying oil and esterifying the resulting product to substantial completion by means of a member of the group consisting of organic acid anhydrides and organic acid chlorides.

2. Process according to claim 1 in which the plastic substance is a cellulose ester.

3. Process according to claim 1 in which the plastic substance is nitrocellulose.

4. Process of making rapidly drying coatings which comprises applying to a base a layer of a plastic substance in alternation with a layer of a transformation product obtained by reacting a phenol-aldehyde resin with an air-drying oil and transforming the resulting product by reacting with a member of the group consisting of organic acid anhydrides and organic acid chlorides in an amount substantially equal to that of the resin.

5. Article of manufacture having a coating comprising a film of a plastic substance in alternation with a film of a transformation product obtained in the reaction of a phenol-aldehyde resin with an air-drying oil and subsequent esterification with a member of the group consisting of organic acid anhydrides and organic acid chlorides.

6. Article of manufacture according to claim 4 in which the plastic substance is a cellulose ester.

7. Article of manufacture according to claim 4 in which the plastic substance is nitrocellulose.

ERNST ELBEL.
FRITZ SEITER.